(No Model.)

J. WALKER.
BELT SHIFTER.

No. 371,647. Patented Oct. 18, 1887.

WITNESSES
Jewett Kelly
Geo. W. King

Jno. Walker
INVENTOR
By
Leggett & Leggett
Attorneys

UNITED STATES PATENT OFFICE.

JOHN WALKER, OF CLEVELAND, OHIO.

BELT-SHIFTER.

SPECIFICATION forming part of Letters Patent No. 371,647, dated October 18, 1887.

Application filed April 25, 1887. Serial No. 236,021. (No model.)

*To all whom it may concern:*

Be it known that I, JOHN WALKER, of Cleveland, in the county of Cuyahoga and State of Ohio, have invented certain new and useful Improvements in Belt-Shifters; and I do hereby declare the following to be a full, clear, and exact description of the invention, such as will enable others skilled in the art to which it pertains to make and use the same.

My invention relates to improvements in belt-shifting mechanism, the primary object being to simplify and cheapen the cost thereof; and it consists in certain features of construction and in combination of parts, hereinafter described, and pointed out in the claims.

Figure 1:
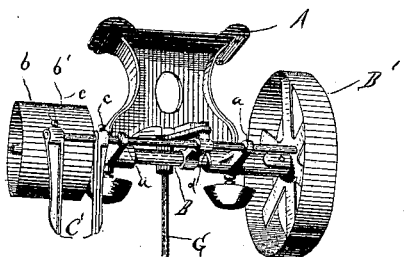
Figure 2:
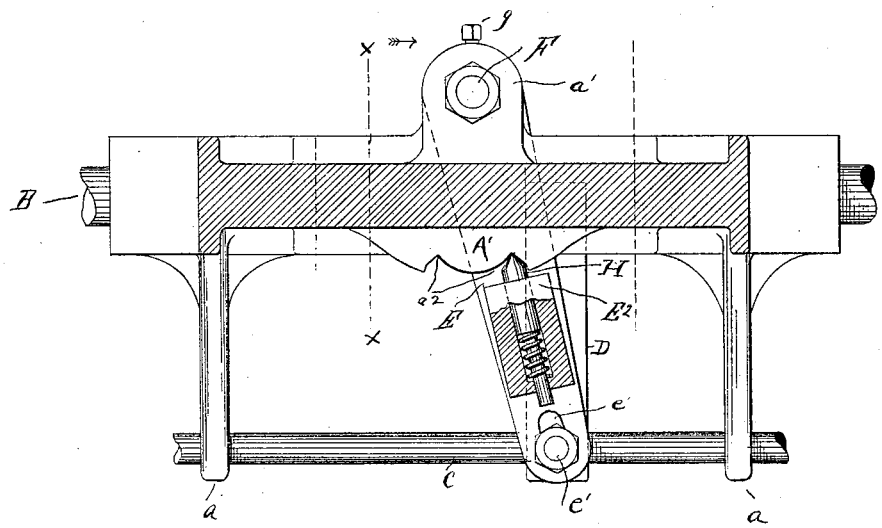
Figure 3:
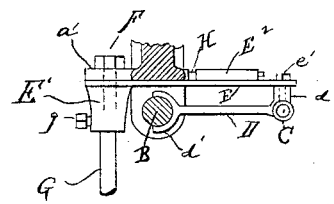

In the accompanying drawings, Figure 1 is a view in perspective of a hanger for a countershaft with my improved belt-shifting mechanism attached thereto. Fig. 2 is a plan, partly in section. Fig. 3 is an elevation in transverse section on the line $x\,x$, Fig. 2.

A represents what is known as a "self-contained hanger" for supporting a counter-shaft, B, the latter being provided with tight and loose pulleys $b$ and $b'$ and a driving-pulley, B'. The hanger A has laterally-projecting arms $a$, extending forward for supporting the sliding rod C, the latter passing through suitable holes made in the arms $a$ near the outer or forward ends of the latter. The rod C has mounted thereon the belt-shifting fingers C', the latter being made adjustable on the rod by means of set-screw fastenings $c$. The rod C passes through a suitable hole in the hub $d$ of the arm D. The inner end of this arm is forked, the prongs thereof, $d'$, being made to embrace the shaft B with an easy fit, so as to slide on the shaft endwise of the latter, by which arrangement, when the arm D is rigidly secured to the rod C, the latter is prevented from turning, and consequently the fingers C', after having been adjusted and made to extend in the direction necessary for engaging the belt, are held in such adjusted position, extending upward, downward, laterally, or on an incline, as the case may be.

E is the shifting lever for moving the rod C endwise in shifting the belt. This lever is pivoted by means of the stud F, the shank of the latter passing loosely through an ear, $a'$, of the hanger, and the screw end of the stud engaging a threaded hole in the hub E' of the lever E. A rod, G, enters the lower end of the bore of this hub, and is secured by a set-screw, $g$. The rod G extends down to where it is accessible, and has a handle, G', for operating the same. The forward end of the lever E is provided with a longitudinal slot, $e$, in which operates the shank of the set-screw $e'$. The latter screws into a threaded hole in the hub $d$, and the point of the screw engages the rod C, so that this set-screw serves as a pivotal connection between the parts, and serves also to fasten the hub $d$ on the rod C. The lever E has a chambered boss, E², in which operates the spring-detent H, arranged substantially as shown in Fig. 2. The beveled outer end of this detent is made to engage, respectively, notches $a^2$ when the shifting rod is at the extremes of its throw. These notches are made in a forwardly-projecting ledge, A', of the hanger, made for this purpose. The curved surface between these notches, and along which the detent slides in passing from one notch to the other, is usually made elliptical, or is made on a radius much less than would reach from thence to the pivotal bearing of the lever E, and consequently the detent is snubbed back in passing from one notch to the other. The outer end walls of these notches are so abrupt as to form positive stops that limit the throw of the belt-shifting mechanism, and the recoil of the detent-spring is sufficient to hold the detent in a notch as against the action of the belt, although the detent may be moved readily enough from one notch to the other in shifting the belt by means of the handle G'.

It will be observed that but few pieces are used in the construction of the belt-shifter, and these pieces are of such construction that but little fitting is required, and such fitting being of the simplest and cheapest kind—to wit, drilling a few holes that have not been cored and screw-threading some of these holes.

What I claim is—

1. In belt-shifting mechanism, the combination, with a shaft and pulley and a sliding rod having fingers attached for shifting the belt, of an arm secured to such sliding rod, said arm being made to embrace and slide on the shaft as a means for holding the belt-shifting device from turning, substantially as set forth.

2. In belt-shifting mechanism, the combination, with the sliding rod bearing shifting-fingers and a bifurcated arm secured to the rod by means of a set-screw, of a lever for operating the sliding rod, the said lever being made to embrace the shank of the aforesaid set-screw, and the latter serving as a fastening for the rod and arm and as a wrist for the said lever, substantially as set forth.

3. In belt-shifting mechanism, the combination, with a sliding rod and the shifting-lever, substantially as indicated, of a spring-detent connected with the shifting-lever, and a hanger having notches made in it for engaging the detent at the extremes of the throw of the belt-shifting mechanism, the parts being arranged substantially as set forth.

In testimony whereof I sign this specification, in the presence of two witnesses, this 26th day of March, 1887.

JOHN WALKER.

Witnesses:
CHAS. H. DORER,
ALBERT E. LYNCH.